(12) United States Patent
Beck

(10) Patent No.: US 9,277,147 B2
(45) Date of Patent: Mar. 1, 2016

(54) MULTIMODE PIXEL READOUT FOR ENHANCED DYNAMIC RANGE

(71) Applicant: Semiconductor Components Industries, LLC, Phoenix, AZ (US)

(72) Inventor: Jeffery Beck, Philomath, OR (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 0 days.

(21) Appl. No.: 14/464,495

(22) Filed: Aug. 20, 2014

(65) Prior Publication Data

US 2015/0055002 A1 Feb. 26, 2015

Related U.S. Application Data

(60) Provisional application No. 61/869,264, filed on Aug. 23, 2013.

(51) Int. Cl.
*H04N 5/355* (2011.01)

(52) U.S. Cl.
CPC ................... *H04N 5/3559* (2013.01)

(58) Field of Classification Search
CPC .................................................. H04N 5/3559
USPC .......................................................... 348/294
See application file for complete search history.

(56) References Cited

U.S. PATENT DOCUMENTS

| | | | |
|---|---|---|---|
| 6,960,796 B2 * | 11/2005 | Rhodes et al. | 257/222 |
| 7,327,393 B2 | 2/2008 | Ying et al. | |
| 7,999,620 B2 | 8/2011 | Kapusta | |
| 8,217,328 B2 * | 7/2012 | Yin | H01L 27/14643 250/208.1 |
| 2004/0252209 A1 | 12/2004 | Loose | |
| 2007/0023801 A1 | 2/2007 | Hynecek | |
| 2007/0145447 A1 | 6/2007 | Lee et al. | |
| 2009/0084943 A1 | 4/2009 | Solhusvik et al. | |
| 2009/0237540 A1 * | 9/2009 | Johnson | 348/308 |
| 2009/0256940 A1 | 10/2009 | Pahr | |
| 2009/0272879 A1 * | 11/2009 | Dai | 250/208.1 |
| 2010/0097371 A1 | 4/2010 | Willassen | |
| 2010/0265371 A1 | 10/2010 | Vogel et al. | |
| 2010/0282946 A1 | 11/2010 | Yin et al. | |
| 2011/0013046 A1 | 1/2011 | Hiyama | |
| 2012/0153123 A1 | 6/2012 | Mao et al. | |
| 2012/0162477 A1 | 6/2012 | Tanaka | |
| 2012/0188427 A1 | 7/2012 | Solhusvik | |
| 2012/0194715 A1 * | 8/2012 | Skaug | 348/300 |
| 2013/0141619 A1 * | 6/2013 | Lim et al. | 348/302 |
| 2014/0078368 A1 | 3/2014 | Komori et al. | |

FOREIGN PATENT DOCUMENTS

WO 2004112376 12/2004

* cited by examiner

*Primary Examiner* — Anthony J Daniels
(74) *Attorney, Agent, or Firm* — Treyz Law Group, P.C.; Jason Tsai

(57) ABSTRACT

An image sensor having image sensor pixels operable in multiple gain modes is provided. An image sensor pixel may include a photodiode, a charge transfer transistor, a reset transistor, a source follower (SF) transistor, a row select transistor, and a capacitor that is directly connected across the gate terminal and a selected source-drain terminal of the SF transistor. The SF transistor and the row select transistor may be selectively coupled to a power supply line and a column output line by asserting either a first control signal or a second control signal. The first control signal is asserted to place the pixel in a low conversion gain mode, whereas the second control signal is asserted to place the pixel in a high conversion gain mode. The charge transfer transistor may always be activated during the low conversion gain mode and may be selectively activated during the high conversion gain mode.

20 Claims, 5 Drawing Sheets

MULTIMODE PIXEL READOUT FOR ENHANCED DYNAMIC RANGE

This application claims the benefit of provisional patent application No. 61/869,264, filed Aug. 23, 2013, which is hereby incorporated by reference herein in its entirety.

BACKGROUND

The present invention relates to image sensors and, more particularly, to image sensors that are used to produce high-dynamic-range images.

Image sensors are commonly used in electronic devices such as cellular telephones, cameras, and computers to capture images. In a typical arrangement, an electronic device is provided with an image sensor and a corresponding lens. Some electronic devices use arrays of image sensors and corresponding lenses to gather image data. In certain applications, such as when acquiring still or video images of a scene with a wide range of light intensities, it may be desirable to capture high-dynamic-range images. In high-dynamic-range images, highlight and shadow detail can be retained that would otherwise be lost in a conventional image.

DETAILED DESCRIPTION

Embodiments of the present invention relate to image sensors, and more particularly, to image sensors with image sensor pixels operable in multiple conversion gain modes. The image sensor pixels may be selectively coupled to a power supply terminal and a pixel output path using associated switches. The switches may be placed in a first state so as to operate the image sensor pixels in a low conversion gain mode and may be placed in a second state to operate the image sensor pixels in a high conversion gain mode. In the low conversion gain mode, the image sensor pixels may be read out using a 3-T readout scheme to expand the dynamic range of the image. In the high conversion gain mode, the image sensor pixels may be read out using a 4-T readout scheme to reduce the noise level in the image. It will be recognized by one skilled in the art, that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices include image sensors that gather incoming light to capture an image. The image sensors may include arrays of imaging pixels. The pixels in the image sensors may include photosensitive elements such as photodiodes that convert the incoming light into image signals. Image sensors may have any number of pixels (e.g., hundreds or thousands of pixels or more). A typical image sensor may, for example, have hundreds of thousands or millions of pixels (e.g., megapixels). Image sensors may include control circuitry such as circuitry for operating the imaging pixels and readout circuitry for reading out image signals corresponding to the electric charge generated by the photosensitive elements.

Figure 1:
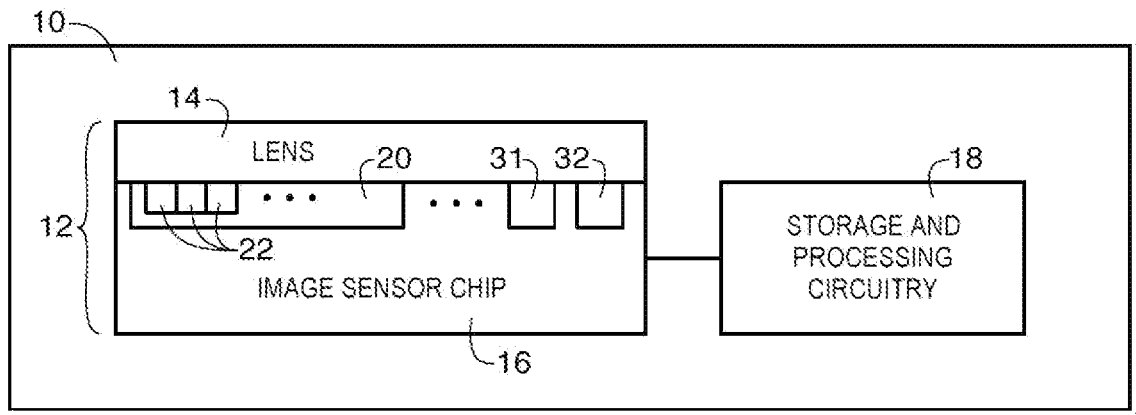
FIG. 1 is a diagram of an illustrative electronic device in accordance with an embodiment of the present invention.

FIG. 1 is a diagram of an illustrative electronic device that uses an image sensor to capture images. Electronic device 10 of FIG. 1 may be a portable electronic device such as a camera, a cellular telephone, a video camera, or other imaging device that captures digital image data. Camera module 12 may be used to convert incoming light into digital image data. Camera module 12 may include one or more lenses 14 and one or more corresponding image sensors 16. Image sensor 16 may be an image sensor system-on-chip (SOC) having additional processing and control circuitry such as analog control circuitry 31 and digital control circuitry 32 on a common image sensor integrated circuit die with image pixel array 20 or on a separate companion die/chip.

During image capture operations, light from a scene may be focused onto an image pixel array (e.g., array 20 of image pixels 22) by lens 14. Image sensor 16 provides corresponding digital image data to analog circuitry 31. Analog circuitry 31 may provide processed image data to digital circuitry 32 for further processing. Circuitry 31 and/or 32 may also be used in controlling the operation of image sensor 16. If desired, camera module 12 may be provided with an array of lenses 14 and an array of corresponding image sensors 16.

Device 10 may include additional control circuitry such as storage and processing circuitry 18. Circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be further processed and/or stored using processing circuitry 18. Processed image data may, if desired, be provided to external equipment (e.g., a computer or other device) using wired and/or wireless communications paths coupled to processing circuitry 18. Processing circuitry 18 may be used in controlling the operation of image sensors 16.

Image sensors 16 may include one or more arrays 20 of image pixels 22. Image pixels 22 may be formed in a semiconductor substrate using complementary metal-oxide-semiconductor (CMOS) technology or charge-coupled device (CCD) technology or any other suitable photosensitive devices.

Some image sensors may be provided with gain selection circuitry to help produce images with enhanced dynamic range. In particular, each pixel may generate a corresponding output value using a selected gain setting. The selected gain setting may depend on the amount of light captured by the pixel during an exposure (i.e., a period of time inversely proportion to shutter speed).

For example, consider a scenario in which an image sensor containing a first set of image pixels and a second set of image pixels is used to capture an image. The first and second sets of image pixels may be exposed to incoming light for a given period of time. The first set of image pixels may capture a portion of the image that is bright, whereas the second set of image pixels may capture a portion of the image that is dark. The gain selection circuitry may detect this difference, thereby configuring the first set of image pixels to generate image data using a low conversion gain setting and configuring the second set of image pixels to generate image data using a high conversion gain setting. Generating a complete image using this approach (e.g., by combining output data generated using the first and second sets of image pixels with respective gain settings) enhances the dynamic range of the captured image. If the gain selection circuitry were not used, the captured image may suffer from overexposed highlights or underexposed shadows. This example is merely illustrative.

Figure 2:
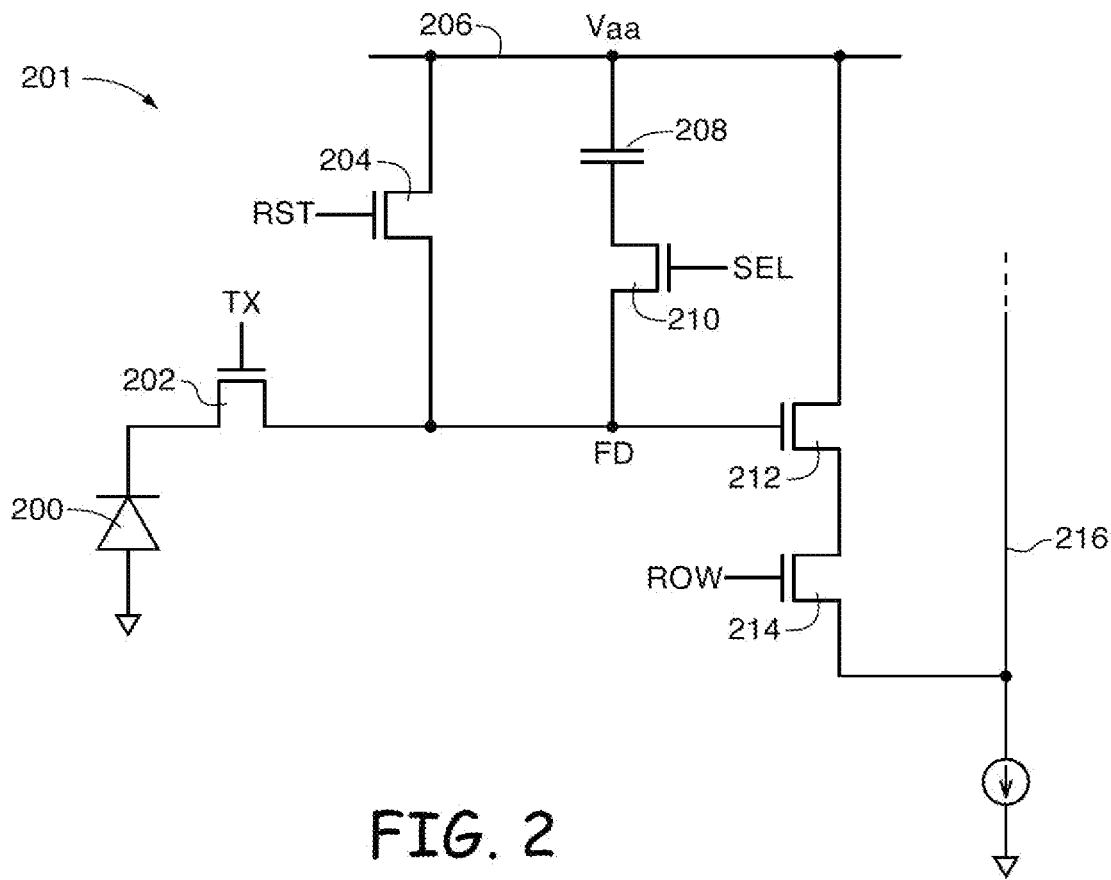
FIG. 2 is a circuit diagram of a conventional image sensor pixel with adjustable conversion gain.

Image sensors that are capable to producing high-dynamic-range are sometimes provided with image sensor pixels operable in different conversion gain modes. FIG. 2 is a circuit diagram of a conventional image sensor pixel 201 with adjustable conversion gain. As shown in FIG. 2, pixel 201 includes photodiode 200 that is coupled to a floating diffusion node FD through charge transfer gate 202. Transfer gate 202 has a gate terminal that is controlled by signal TX. A reset transistor 204 is coupled between a positive power supply line 206 (e.g., a positive power supply line on which positive power supply voltage Vaa is provided) and node FD. Reset transistor 204 has a gate terminal that is controlled by signal RST.

Pixel 201 also includes a source follower transistor 212 and a row select transistor 214 that are coupled in series between power supply line 206 and column output line 216. Source follower transistor 212 has a gate terminal that is coupled to node FD, whereas row select transistor 214 has a gate terminal that is controlled using row select signal ROW. Pixels 201 located along the same row may receive a common row select signal ROW, whereas pixels 201 located along the same column are coupled to different row select lines. Only one of row select transistors 214 in a column of image sensor pixels can be turned on at any given point in time during read operations.

In particular, image pixel 201 includes capacitor 208 and transistor 210 coupled in series between positive power supply line 206 and floating diffusion node FD. Transistor 210 has a gate terminal that receives signal SEL. When transistor 210 is turned off (i.e., when SEL is low), pixel 201 is placed in a high conversion gain mode. When transistor 210 is turned on (i.e., when SEL is high), transistor is placed in a low conversion gain mode. The conventional pixel implementation of FIG. 2 includes five transistors. Having an additional transistor 210 provides two conversion gain modes but significantly increases pixel area, which undesirably reduces the effective fill factor of an image sensor pixel, which is sometimes defined as the percentage of the pixel area that is sensitive to light. It would therefore be desirable to provide improved image sensor pixels that can generate high-dynamic-range (HDR) images without severely reducing the pixel fill factor.

Figure 3:
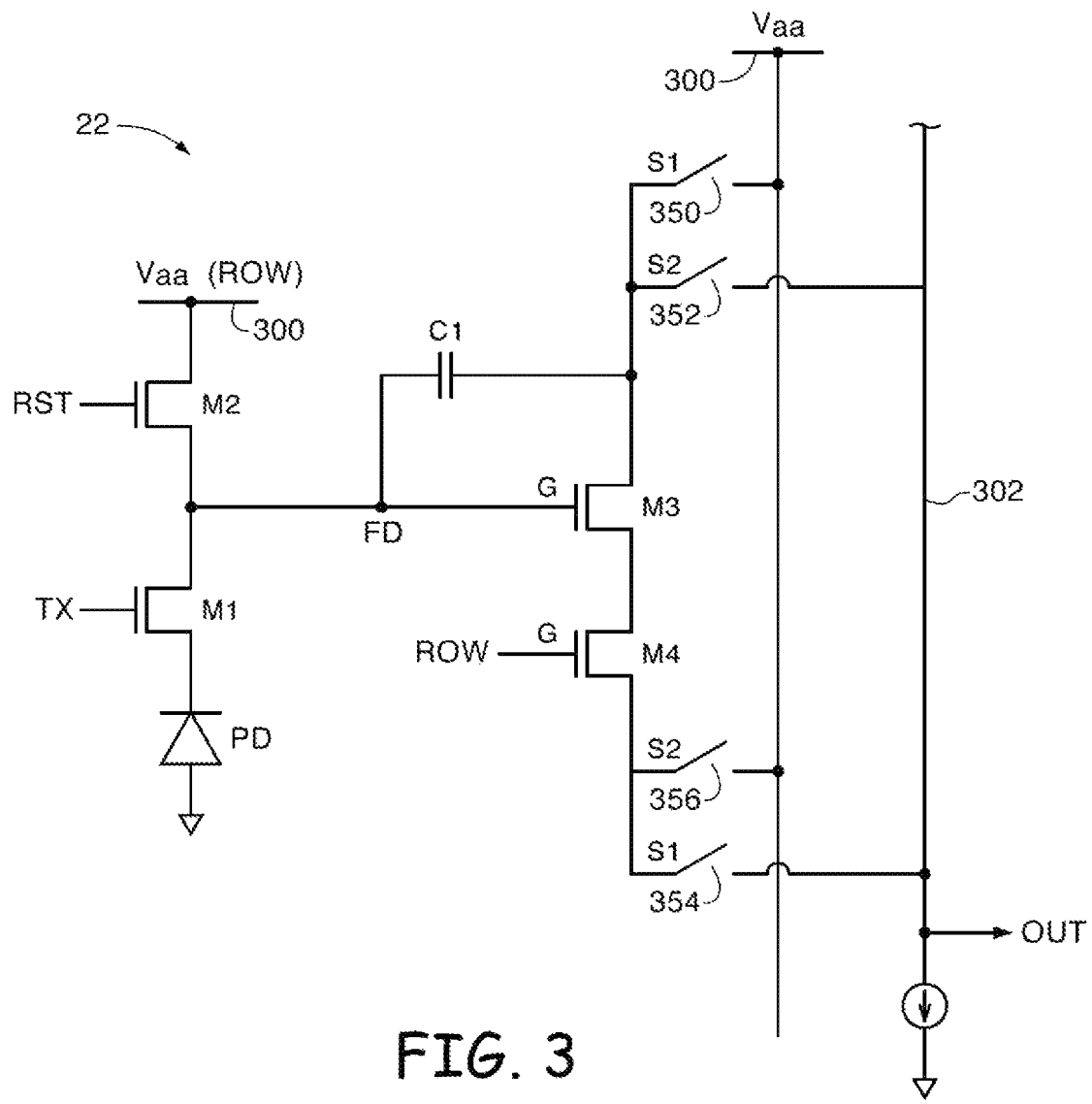
FIG. 3 is a circuit diagram of an illustrative image sensor pixel operable in a low conversion gain mode and a high conversion gain mode in accordance with an embodiment of the present invention.

In accordance with an embodiment of the present invention, an image sensor pixel such as pixel 22 that can be operated in multiple gain modes without increasing the transistor count within each pixel is shown in FIG. 3. As shown in FIG. 3, image sensor pixel 22 may include a photosensitive element (e.g., a photodiode or other light gathering element) PD, a charge transfer transistor M1, a reset transistor M2, a source follower (SF) transistor M3, and a row select transistor M4. Photodiode PD may have a first (p-type) terminal that is coupled to ground and a second (n-type) terminal that is coupled to charge transfer transistor M1. Transistor M1 may have a first source-drain terminal that is coupled to photodiode PD, a gate terminal that receives charge transfer control signal TX, and a second source-drain terminal that is coupled to a floating diffusion region FD. Signal TX may be asserted to transfer integrated charge in photodiode PD into the floating diffusion region FD. Floating diffusion region FD is sometimes implemented using a diode structure, but region FD should not directly receive incoming light. The term "source-drain" terminal may refer to either the source terminal or the drain terminal of a transistor, since the terms "source" and "drain" are sometimes used interchangeably.

Reset transistor M2 may have a drain terminal that is coupled to a positive power supply terminal 300 (e.g., a power supply terminal on which positive power supply voltage Vaa is provided), a source terminal that is coupled to the floating diffusion region FD, and a gate terminal that receives reset control signal RST. Signal RST may be asserted to reset the voltage level of region FD to power supply voltage Vaa (sometimes referred to as reset voltage level).

Transistors M3 and M4 may be coupled in series. In particular, transistor M3 may have a first source-drain terminal, a gate terminal that is coupled to the floating diffusion region FD, and a second source-drain terminal that is directly connected to transistor M4. Transistor M4 may have a first source-drain terminal that is directed connected to the second source-drain terminal of transistor M3, a gate terminal receives row select signal ROW, and a second source-drain terminal. Signal ROW may be asserted to read signals out from this particular pixel. In some suitable embodiments, the drain terminal of transistor M2 may be coupled to the row control line on which signal ROW is provided instead of being coupled to power supply line 300.

In accordance with an embodiment, pixel 22 may include a capacitor C1 having a first terminal that is directly coupled to the floating diffusion region FD and a second terminal that is directly coupled to the first source drain terminal of transistor M3. Unlike the conventional pixel implementation of FIG. 2, there is no switch that is included within pixel 22 that is connected in series with capacitor C1.

In general, pixel conversion gain is inversely proportional to the amount of loading capacitance at node FD. In the example of FIG. 3, capacitor C1 is always connected across the gate terminal and the first source-drain terminal of transistor M3. To provide multiple conversion gain (CG) mode capabilities, pixel 22 may be selectively coupled to power supply line 300 and column pixel output line 302 using switches 350, 352, 354, and 356. Switches 350, 352, 354, and 356 may be implemented using single pass transistors, CMOS transmission gates, multiplexing circuitry, and/or other suitable type of switching circuitry.

As shown in FIG. 3, the first source-drain terminal of source-follower transistor M3 may be coupled to either power supply terminal 300 via switch 350 or output line 302 via switch 352. Similarly, the second source-drain terminal of row select transistor M4 may be coupled to either output line 302 via switch 354 or power supply terminal 356 via switch 356. Switches 350 and 354 may be controlled using signal S1, whereas switches 352 and 356 may be controlled using signal S2.

Figure 4:
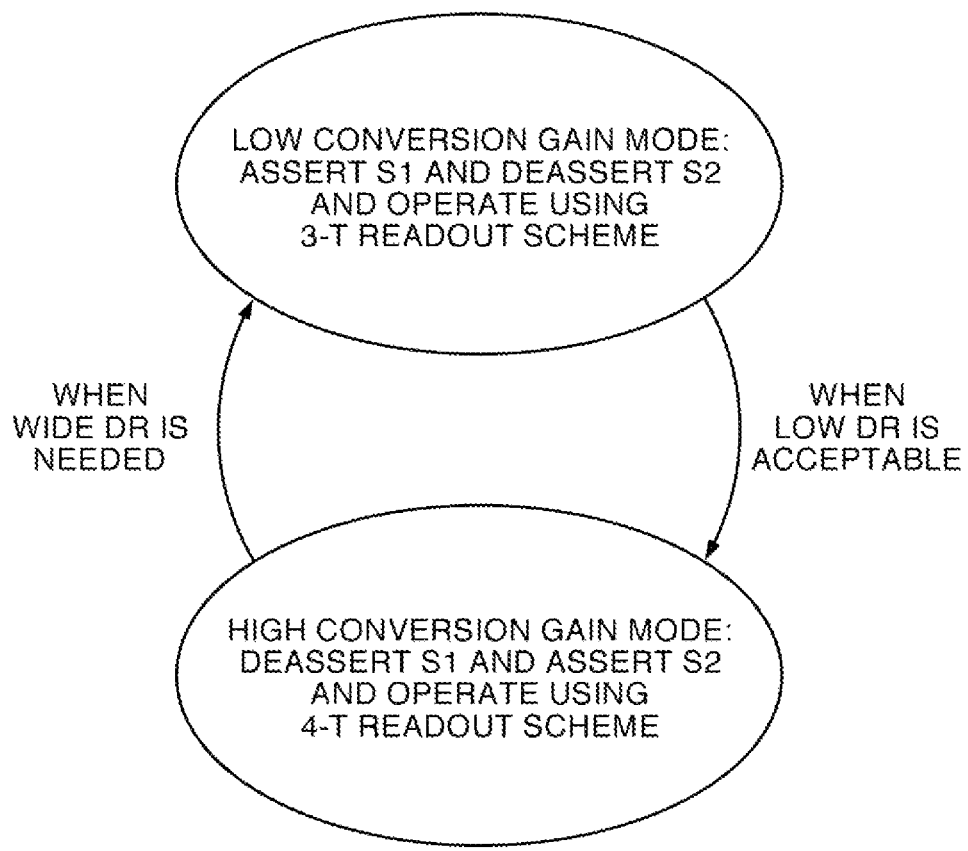
FIG. 4 is a diagram showing different modes in which the image sensor pixel of FIG. 3 may be operated in accordance with an embodiment of the present invention.

Depending on the state of these switches (e.g., switches 350, 352, 354, and 356), pixel 22 may be operated in at least two conversion gain modes (see, FIG. 4). As shown in FIG. 4, signal S1 may be asserted while S2 is deasserted to configure pixel 22 in a low conversion gain mode. Asserting only S1 (and not S2) will couple the first source-drain terminal of transistor M3 to power supply terminal 300 (e.g., by turning on switch 350) and will couple the second source-drain terminal of transistor M4 to output line 302 (e.g., by turning on switch 354). Connected in this way, capacitor C1 contributes to the total load capacitance at region FD, thereby lowering conversion gain. To further reduce the conversion gain, pixel 22 may be read out using a first readout configuration in which signal TX is always asserted. By always activating the charge transfer transistor, floating diffusion region FD is exposed to the capacitance of photodiode PD, which further increases the loading at FD. This type of readout scheme is typically used in pixels with only three transistors and is therefore sometimes referred to as the "3-T" readout operation. The low conversion gain mode may generally be used when wide dynamic range is desired.

When low dynamic range is acceptable (e.g., when acquiring images in low light conditions), it may be desirable to operate pixel 22 in a high conversion gain mode. To place pixel 22 in high conversion gain mode, signal S1 may be deasserted while S2 is asserted. Asserting only S2 (and not S1) will couple the first source-drain terminal of transistor M3 to output line 302 (e.g., by turning on switch 352) and will couple the second source-drain terminal of transistor M4 to power supply line 300 (e.g., by turning on switch 356). Connected in this way, capacitor C1 does not contribute much capacitance to the total load capacitance at region FD since the source follower transistor M3 effectively simultaneously moves the voltage across the two terminals of capacitor C1 when connected as such. Moreover, pixel 22 may be read out using a second readout configuration in which signal TX is only temporarily pulsed high. This type of readout scheme is typically used in pixels with only four transistors and is therefore sometimes referred to as the "4-T" readout operation. If desired, pixel 22 may also be read out using the 4-T configuration when operated in the low conversion gain mode.

Switches 350, 352, 354, and 356 may be shared among all pixels 22 that are arranged along the same column. In other words, all pixels 22 in the array will either be operated in the low conversion gain mode (i.e., by asserting only S1) or in the high conversion gain mode (i.e., by asserting only S2). By sharing the gain control switches among an entire column of pixels, the fill factor of pixel 22 can be maximized.

Figure 5:
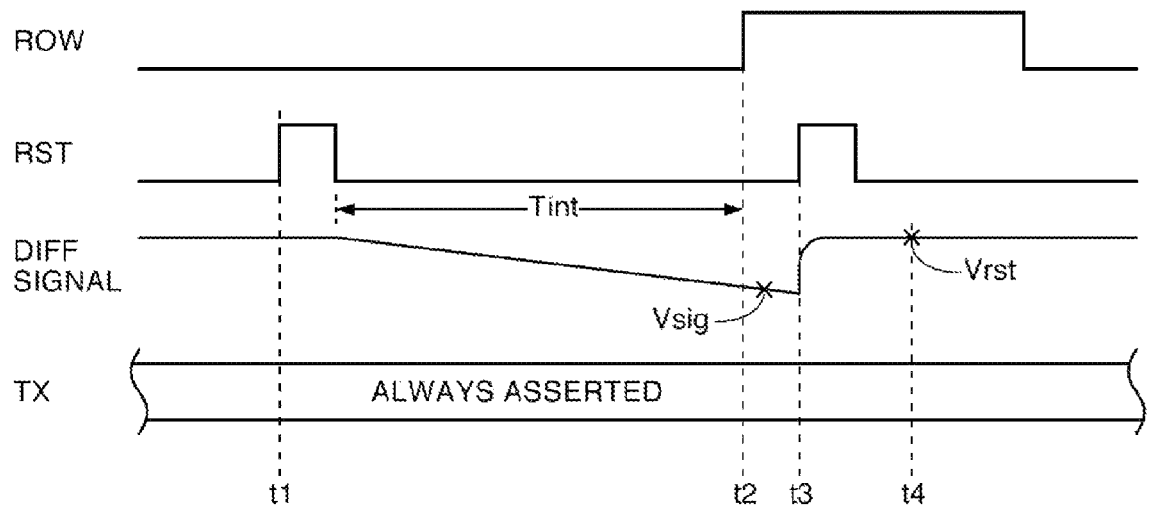
FIG. 5 is a timing diagram that illustrates the behavior of relevant signals when the image sensor pixel of FIG. 3 is read out using the "3-T" readout scheme in accordance with an embodiment of the present invention.

FIG. 5 is a timing diagram that illustrates the behavior of relevant signals when the image sensor pixel 22 is read out using the 3-T readout scheme. At time t1, reset signal RST may be pulsed high to reset the diffusion signal. In the 3-T configuration, the diffusion signal may represent the combined voltage of floating diffusion region FD and photodiode PD since the charge transfer transistor is always on (e.g., signal TX is always asserted). Thereafter, pixel 22 may be allowed to collect charge during integration time period Tint.

At the end of the Tint (i.e., at time t2), row select signal ROW may be asserted and an image signal Vsig may be sampled from the selected pixel. At time t3, reset signal RST may again be pulsed high to reset the diffusion signal. After the diffusion signal has been driven back to the reset level, a reset signal Vrst may be sampled from the selected pixel (at time t4). Thereafter, a difference between Vrst and Vsig may be computed to obtain the final pixel signal. In the 3-T configuration, Vsig is sampled before Vrst.

Figure 6:
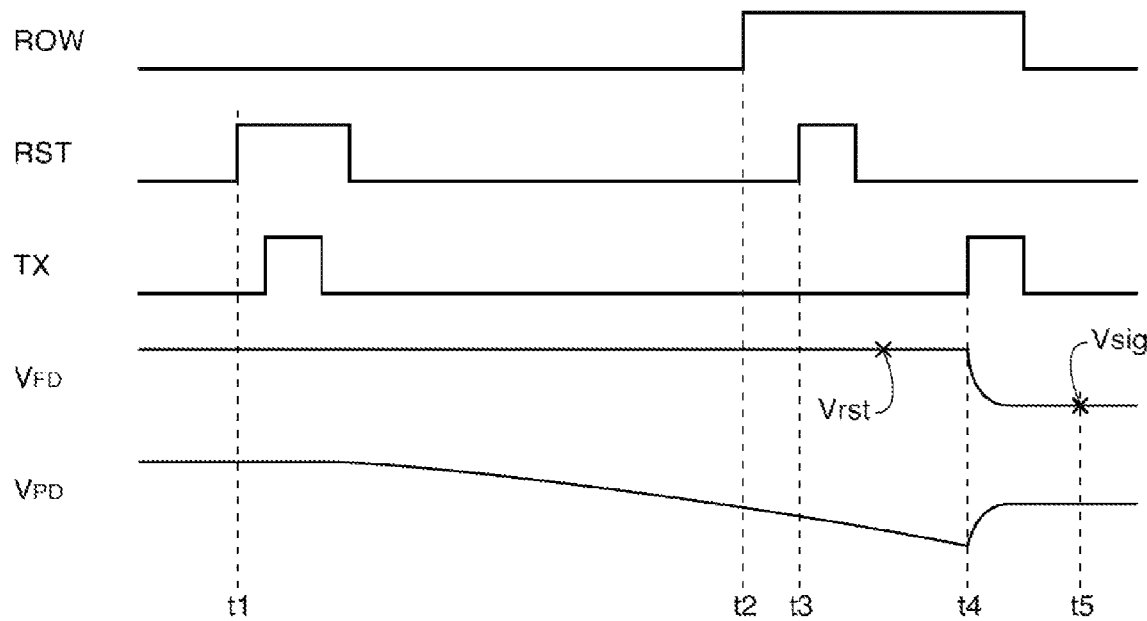
FIG. 6 is a timing diagram that illustrates the behavior of relevant signals when the image sensor pixel of FIG. 3 is read out using the "4-T" readout scheme in accordance with an embodiment of the present invention.

FIG. 6 is a timing diagram that illustrates the behavior of relevant signals when the image sensor pixel 22 is read out using the 4-T readout scheme. At time t1, reset signal RST may be pulsed high to reset only the voltage level of the floating diffusion region ($V_{FX}$). While RST is high, charge transfer gate control signal TX may also be pulsed high to reset the voltage level of the photodiode region ($V_{PD}$). Thereafter, pixel 22 may be allowed to collect charge (see, e.g., $V_{PD}$ changing with time).

At time t2, row select signal ROW may be asserted. At time t3, reset signal RST may again be pulsed high to only reset the floating diffusion region FD. Thereafter, a reset signal Vrst may be sampled from the selected pixel. At time t4, charge transfer gate control signal TX may be pulsed high to transfer the charge from photodiode PD to the floating diffusion region FD. Once the collected charge has been transferred, image signal Vsig may be sampled from the selected pixel. Thereafter, a difference between Vrst and Vsig may be computed to obtain the final pixel signal. In the 4-T configuration, Vrst is sampled before Vsig.

The 3-T and 4-T readout configuration as shown in FIGS. 5 and 6 are merely illustrative and do not limit the scope of the present invention. If desired, the order of operations may be altered and additional steps may be inserted without departing from the spirit of the invention.

Figure 7:
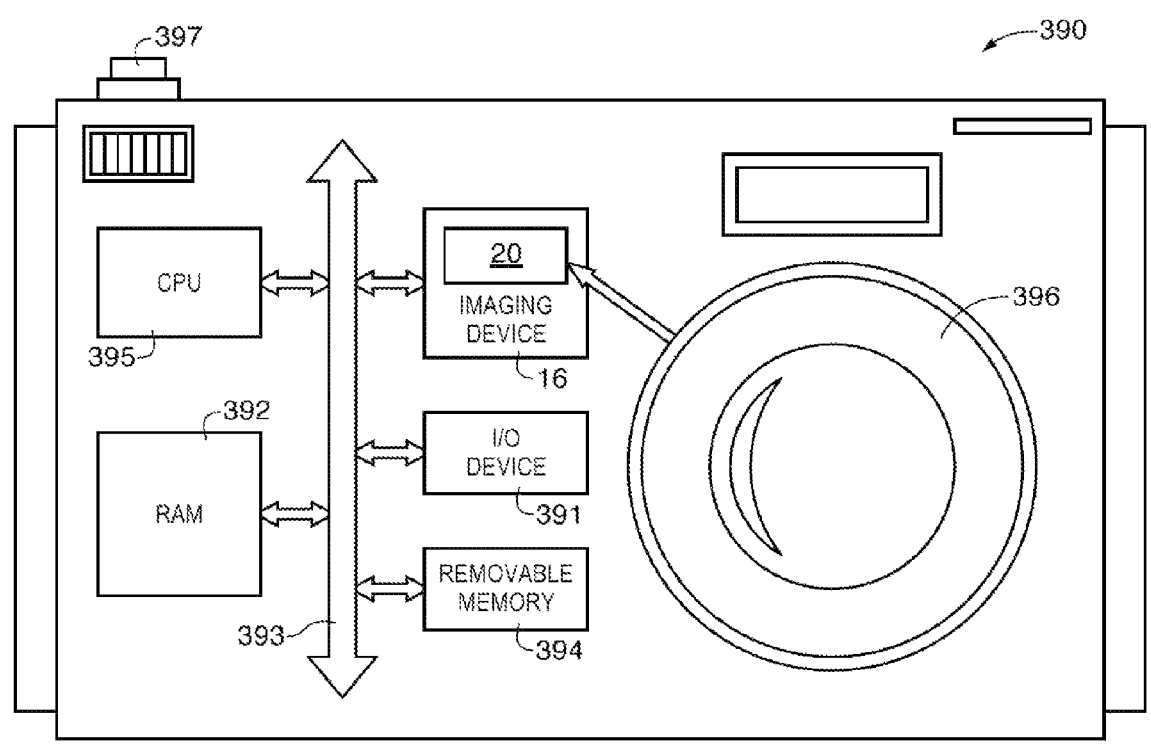
FIG. 7 is a block diagram of a processor system that may employ some of the embodiments of FIGS. 3-6 in accordance with an embodiment of the present invention.

FIG. 7 shows, in simplified form, a typical processor system 390. Processor system 390 is exemplary of a system having digital circuits that include imaging device 16 with the pixel circuitry operable in multiple gain modes of the type described in connection with FIGS. 3-6. Without being limiting, such a system could include a computer system, still or video camera system, scanner, machine vision, vehicle navigation, video phone, surveillance system, auto focus system, star tracker system, motion detection system, image stabilization system, video gaming system, video overlay system, and other systems employing an imaging device.

Processor system 390, which may be a digital still or video camera system, may include a lens such as lens 396 for focusing an image onto a pixel array such as pixel array 20 when shutter release button 397 is pressed. Processor system 390 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 16 may also communicate with CPU 395 over bus 393. System 390 may include random access memory (RAM) 392 and removable memory 394. Removable memory 394 may include flash memory that communicates with CPU 395 over bus 393. Imaging device 16 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating imaging systems with an image sensor having pixel circuitry operable in at least two different conversion gain modes. For example, an image sensor may include an array of image sensor pixels arranged in rows and columns, wherein each image sensor pixel in the array includes a photodiode, a floating diffusion region, a charge transfer transistor that is coupled between the photodiode and the floating diffusion region, a source follower transistor having a gate terminal, a first source-drain terminal, and a second source-drain terminal, and a capacitor having a first terminal that is directly coupled to the first source-drain terminal of the source follower transistor and a second terminal that is directly coupled to the second source-drain terminal of the source follower transistor.

Image sensor pixels arranged along the same column may be coupled to a plurality of switches that are shared among the image sensor pixels along that column. The plurality of switches may be placed in a first state during a low conversion gain mode and may be placed in a second state during a high conversion gain mode. In particular, a first switch in the plurality of switches may be coupled between the first source-drain terminal of the source follower transistor in each image sensor pixel along the column and a power supply line, whereas a second switch in the plurality of switches may be coupled between the second source-drain terminal of the source follower transistor in each image sensor pixel along the column and a corresponding column output line. The first and second switches may receive a first control signal.

A third switch in the plurality of switches may be coupled between the first source-drain terminal of the source follower transistor in each image sensor pixels along the column and the column output line, whereas a fourth switch in the plurality of switches may be coupled between the second source-drain terminal of the source follower transistor in each of the image sensor pixels along that column and the power supply line. The third and fourth switches may receive a second control signal. Only one of the first and second signals may be asserted at any given point in time. Asserting the first control signal will place the image sensor in the low conversion gain mode, whereas asserting the second control signal will place the image sensor in the high conversion gain mode.

The foregoing is merely illustrative of the principles of this invention and various modifications can be made by those skilled in the art without departing from the scope and spirit of the invention. The foregoing embodiments may be implemented individually or in any combination.

What is claimed is:

1. Image sensor pixel circuitry, comprising:
    a photosensitive element;
    a floating diffusion region;
    a charge transfer transistor coupled between the photosensitive element and the floating diffusion region;
    a source follower transistor having a gate terminal, a first source-drain terminal, and a second source-drain terminal, wherein the gate terminal of the source follower transistor is coupled to the floating diffusion region;
    a capacitor having a first terminal that is directly coupled to the floating diffusion region and a second terminal that is directly coupled to the first source-drain terminal of the source follower transistor, wherein the image sensor pixel circuitry is operable in a low conversion gain mode and a high conversion gain mode;
    a power supply line;
    a reset transistor coupled between the power supply line and the floating diffusion region; and
    a first switch that is coupled between the power supply line and the first source-drain terminal of the source follower transistor, wherein the first switch is turned on during the low conversion gain mode and is turned off during the high conversion gain mode.

2. The image sensor pixel circuitry defined in claim 1, further comprising:
    a pixel output line; and
    a second switch that is coupled between the second source-drain terminal of the source follower transistor and the pixel output line, wherein the first and second switches receive the same control signal.

3. The image sensor pixel circuitry defined in claim 1, further comprising:
    a pixel output line;
    a second switch that is coupled between the first source-drain terminal of the source follower transistor and the pixel output line; and
    a third switch that is coupled between the second source-drain terminal of the source follower transistor and the power supply line, wherein the second and third switches receive the same control signal.

4. The image sensor pixel circuitry defined in claim 1, further comprising:
    a second switch that is coupled between the second source-drain terminal of the source follower transistor and the power supply line, wherein only one of the first and second switches is turned on.

5. The image sensor pixel circuitry defined in claim 1, further comprising:
    a column output line;
    a second switch that is coupled between the first source-drain terminal of the source follower transistor and the column output line; and
    a third switch that is coupled between the second source-drain terminal of the source follower transistor and the column output line, wherein only one of the second and third switches is turned on.

6. The image sensor pixel circuitry defined in claim 1, further comprising:
    an output line;
    a second switch that is coupled between the second source-drain terminal of the source follower transistor and the output line, wherein the first and second switches receive a first control signal;
    a third switch that is coupled between the first source-drain terminal of the source follower transistor and the output line; and
    a fourth switch that is coupled between the second source-drain terminal of the source follower transistor and the power supply line, wherein the third and fourth switches receive a second control signal that is different than the first control signal.

7. The image sensor pixel circuitry defined in claim 6, further comprising:
    a row select transistor interposed between the source follower transistor and the second and fourth switches.

8. The image sensor pixel circuitry defined in claim 6, wherein the first, second, third, and fourth switches are shared among image sensor pixels arranged along the same column.

9. A method for operating an image sensor that includes an array of image sensor pixels arranged in rows and columns, wherein each image sensor pixel in the array includes a source follower transistor having a gate terminal, a first source-drain terminal, and a second source-drain terminal and further includes a capacitor having a first terminal that is directly connected to the gate terminal of the source follower transistor and a second terminal that is directly connected to the first source-drain terminal of the source follower transistor, the method comprising:
    during a first mode, coupling the first source-drain terminal of the source follower transistor to a power supply line and coupling the second source-drain terminal of the source follower transistor to a column output line; and
    during a second mode, coupling the first source-drain terminal of the source follower transistor to the column output line and coupling the second source-drain terminal of the source follower transistor to the power supply line.

10. The method defined in claim 9, wherein the first mode comprises a low conversion gain mode, and wherein the second mode comprises a high conversion gain mode.

11. The method defined in claim 9, wherein each image sensor pixel in the array also includes a charge transfer transistor having a gate terminal that receives a charge transfer control signal, the method further comprising:
   always asserting the charge transfer control signal during the first mode.

12. The method defined in claim 11, further comprising:
   temporarily disabling the charge transfer control signal during the second mode.

13. The method defined in claim 9, further comprising:
   sampling an image signal from a selected image sensor pixel in the array before sampling a reset signal from the selected image sensor pixel during the first mode; and
   computing a difference between the sampled image signal and the sampled reset signal.

14. The method defined in claim 9, further comprising:
   sampling a reset signal from a selected image sensor pixel in the array before sampling an image signal from the selected image sensor pixel during the second mode; and
   computing a difference between the sampled image signal and the sampled reset signal.

15. The method defined in claim 9, wherein each image sensor pixel in the array also includes a reset transistor and a row select transistor that is coupled in series with the source follower transistor, the method further comprising:
   simultaneously applying a row select signal to a drain terminal of the reset transistor and to a gate terminal of the row select transistor.

16. A system, comprising:
   a central processing unit;
   memory;
   a lens;
   input-output circuitry; and
   an image sensor having an array of image sensor pixels arranged in rows and columns, wherein each image sensor pixel in the array comprises:
      a floating diffusion region;
      a source follower transistor having a gate terminal, a first source-drain terminal, and a second source-drain terminal, wherein the gate terminal of the source follower transistor is coupled to the floating diffusion region; and
      a capacitor having a first terminal that is directly coupled to the floating diffusion region and a second terminal that is directly coupled to the first source-drain terminal of the source follower transistor, wherein the image sensor pixel is operable in a low conversion gain mode and a high conversion gain mode, wherein the first source-drain terminal of the source follower transistor is coupled to a power supply line during the low conversion gain mode, and wherein the second source-drain terminal of the source follower transistor is coupled to the power supply line during the high conversion gain mode.

17. The system defined in claim 16, wherein the image sensor further comprises:
   a plurality of switches that are shared among a column of image sensor pixels in the array, wherein the plurality of switches are placed in a first state during the low conversion gain mode and are placed in a second state during the high conversion gain mode.

18. The system defined in claim 17, wherein a first switch in the plurality of switches is coupled between the first source-drain terminal of the source follower transistor in each image sensor pixel along the column and the power supply line, wherein a second switch in the plurality of switches is coupled between the second source-drain terminal of the source follower transistor in each image sensor pixel along the column and a column output line, and wherein the first and second switches both receive a first control signal.

19. The system defined in claim 18, wherein a third switch in the plurality of switches is coupled between the first source-drain terminal of the source follower transistor in each image sensor pixel along the column and column output line, wherein a fourth switch in the plurality of switches is coupled between the second source-drain terminal of the source follower transistor in each image sensor pixel along the column and the power supply line, and wherein the third and fourth switches both receive a second control signal that is different than the first control signal.

20. The system defined in claim 16, wherein each image sensor pixel in the array further comprises a charge transfer transistor, wherein the charge transfer transistor is always activated during the low conversion gain mode and is sometimes deactivated during the high conversion gain mode.

* * * * *